June 30, 1953  D. D. AULDRIDGE  2,643,418
METHOD OF MAKING FISHING LURES
Filed July 3, 1950  2 Sheets-Sheet 1
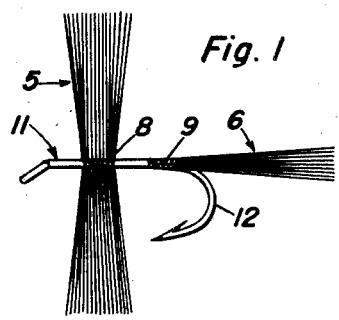
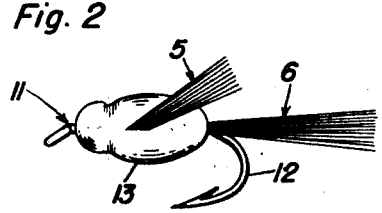
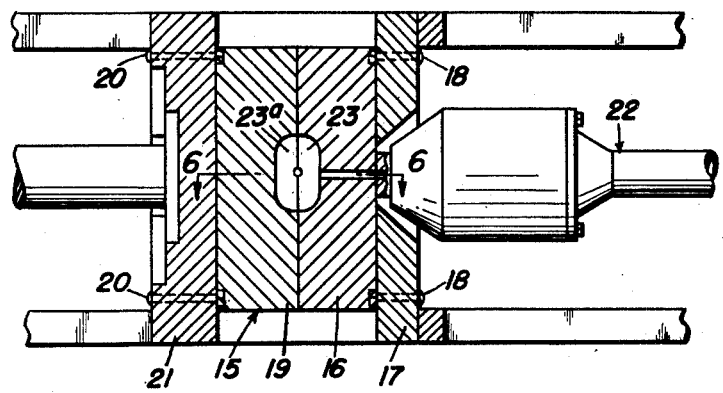
Inventor
Dexter D. Auldridge June 30, 1953     D. D. AULDRIDGE     2,643,418
METHOD OF MAKING FISHING LURES Filed July 3, 1950     2 Sheets-Sheet 2

Inventor
Dexter D. Auldridge

By Clarence A. O'Brien
and Harvey B. Jacobson
Attorneys

Patented June 30, 1953

2,643,418

UNITED STATES PATENT OFFICE 2,643,418

METHOD OF MAKING FISHING LURES

Dexter D. Auldridge, South Charleston, W. Va., assignor of one-half to A. S. Tennant, South Charleston, W. Va.

Application July 3, 1950, Serial No. 171,828

1 Claim. (Cl. 18—59)

This invention relates to the production of fishing lures which include a fish hook, and an artificial imitation of a live or natural bait carried by said fish hook, said imitation comprising an element tied on the shank of the hook, and a molded body of thermoplastic material on the shank of the hook, the portion or portions of said element adjacent said shank being embedded in said body, the outer portion or portions of said element projecting from or beyond said body and representing a part or parts of the imitated live bait which protrude from the body thereof.

An object of the present invention is to provide a method by which lures of the above kind and of uniform high quality may be expeditiously and economically made.

Another object is to provide a novel form of mold for use in successfully carrying out certain steps of the present method.

Other objects and features of the invention will be apparent from the following description when considered with the accompanying drawings, in which:

Figure 1 is a side elevational view of a fish hook having feather type wing and tail elements tied on the shank thereof in accordance with the present invention;

Figure 2 is a similar view of the completed lure formed by use of the assembly shown in Figure 1;

Figure 3 is a fragmentary view, partly in vertical section and partly in elevation, showing the mold of the present invention operatively associated with parts of an injection molding machine;

Figure 7:
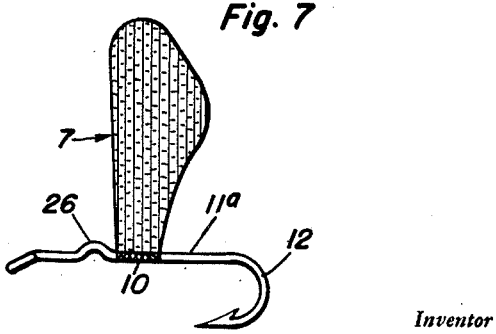
Figure 7 is a view similar to Figure 1 of a fish hook having sheet type wing elements tied on the shank thereof.

In carrying out the present invention, any conventional element, such as a feather type wing element 5 and/or a feather type tail element 6 (Figure 1), or a sheet type wing element 7 (Figure 7 is tied in a well known manner as at 8, 9 and 10, respectively, upon the shank of an ordinary fish hook 11 or 11a, so that such element is or elements are in the same plane as the curved portion 12 of the fish hook. A body 13 or 14 of thermoplastic material is then molded by an injection molding operation on the shank of the fish hook so that the portion or portions of said element or elements adjacent the shank of the fish hook is or are embedded therein, and the outer portion or portions of said element or elements projects or project from or beyond the body to represent a part or parts of the imitated live or natural bait which protrude from the body thereof. Obviously, any of the many well known elements of this kind may be used according to the particular kind of lure being made, such as leg, feeler and fin elements of various types.

In molding the body, a special mold 15 is employed in connection with an injection molding machine, one suitable type of which is shown in the U. S. patent to M. A. Bauman, No. 2,476,272, July 19, 1949. By means of this type of molding operation, in which the material is injected into the mold at high pressures, the mold cavity is completely filled and a dense or perfect body results which tightly surrounds the hook shank so as to insure against ready or accidental rotation of said body relative to said shank.

The mold includes a section 16 adapted to be fixed to the centrally apertured stationary platen 17 of the molding machine by screws 18, and a section 19 fixed by screws 20 to the movable platen 21 of said machine. The material is delivered to the mold by an injection plunger 22. Similar recesses 23 and 23a are provided in the adjacent faces of the mold sections to form the mold cavity for the lure body, and similar grooves 24 and 24a are also provided in such faces to accommodate the ends of the fish hook beyond the ends of said recesses so as to permit the mold sections to be brought together in face to face contact. The hook and element assembly must be applied to one of the mold sections and held in place when the latter are separated. As shown, the mold section 19 has permanent magnets 25 and 25a embedded in the face thereof at opposite ends of the recess 23a so as to coact with the ends of the fish hook and hold the latter in place by magnetic attraction. The mold sections are then brought together, whereupon the material is injected into the mold cavity. After the material has cooled and hardened, the mold sections are separated, the product is removed from the mold section 19, and the plastic sprue is cut from the lure body.

When making a lure such as shown in Figure 2, a fish hook is used which has a plain straight shank, because the element 5 and the body 13 must be forcibly turned a quarter turn relative to the hook after the product is removed from the mold so that the ends of said element will project in a direction substantially at right angles to the plane of the curved portion 12 of the fish hook. While this will destroy any mechanical bond between the hook and the body, the latter will still have such frictional engagement with the hook as to prevent the body from turning relative to the hook under normal conditions of use.

Figure 4:
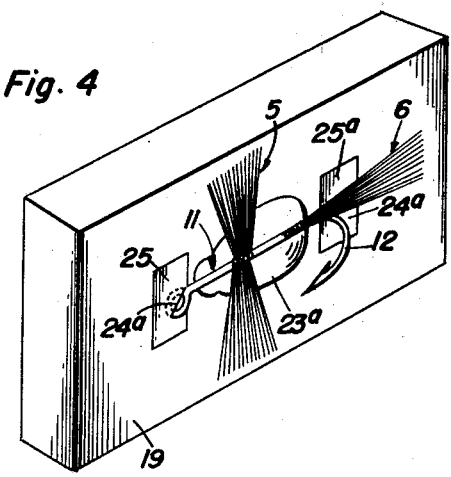
Figures 4 and 5 are perspective views of the respective mold sections, with the assembly of Figure 1 applied to one of said mold sections.
Figure 5:
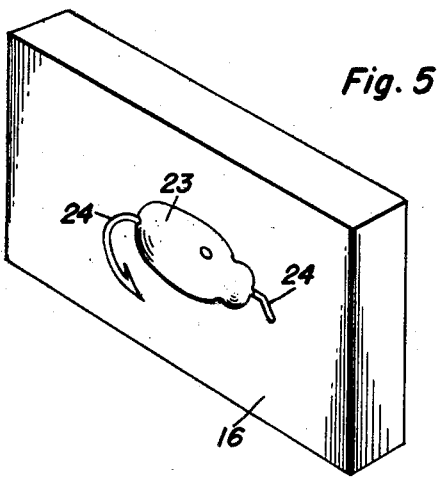
Figure 6:
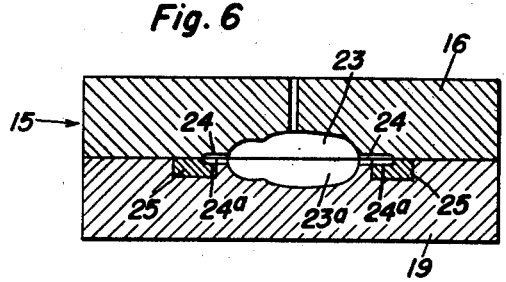
Figure 6 is a horizontal section through the mold, taken on the line 6—6 of Figure 3.
Figure 8:
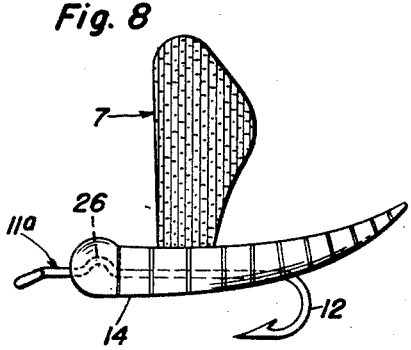
Figure 8 is a similar view of the completed lure formed by use of the assembly shown in Figure 7.

When the element remains in substantially the same plane as the hook portion 12 in the finished product, as in Figure 8, the body 14 is preferably molded on a hook having its shank provided with a hump 26 or the like adapted to be embedded in the body to positively prevent turning thereof.

From the foregoing description, the nature and advantages of the present invention will be understood and appreciated by those skilled in the art. The method can be used to produce lures employing elements of any kind to simulate legs, fins and other like parts of a natural bait projecting from the plastic body.

Having described the invention, what is claimed as new is:

The method of making a fishing lure wherein the finished product comprises a common fishhook and a feathered plastic body representation mounted on the median portion of the shank of the hook between the eye and bent hook end; said method comprising a first step wherein a carcass is preliminarily prepared for injection molding by winding and tying thread means around the stated shank and simultaneously uniting the feathers with said shank so that all feathers will be in the same plane, a plane which is substantially parallel with the plane of the bend of the hook on said shank, a second step involving attaching the end portions of the fishhook to spaced permanent magnets in the flat face of a recessed mold section so that the shank spans the recess in said mold section, so that the tied feathers lie in flat contact with the face of the mold section projecting to opposite sides of the recess in the mold section and so that the tying thread is at the exact center of the recess, the third step of bringing a complemental recessed mold section into aligned molding relation with the first mentioned mold section, and injecting thermoplastic material under pressure in a plastic condition into the recesses in the mold sections and allowing it to set and to conform with the shape of the recesses and to encompass the tying thread, and adjacent portions of the feathers, and leaving portions of the feathers projecting beyond the marginal portions of the molded thermoplastic material.

DEXTER D. AULDRIDGE.

References Cited in the file of this patent

UNITED STATES PATENTS

| Number | Name | Date |
|---|---|---|
| 2,266,169 | Crumrine | Dec. 16, 1941 |
| 2,298,156 | Person | Oct. 6, 1942 |
| 2,341,999 | Lennington | Feb. 15, 1944 |
| 2,343,238 | Manning | Mar. 7, 1944 |
| 2,453,739 | Bates | Nov. 16, 1948 |
| 2,457,440 | Booth | Dec. 28, 1948 |
| 2,465,276 | Ryder | Mar. 22, 1949 |
| 2,495,592 | Morin | Jan. 24, 1950 |